Nov. 14, 1950     J. F. MORSE     2,530,205
MARINE ENGINE CONTROL MECHANISM
Filed May 7, 1945     5 Sheets-Sheet 1
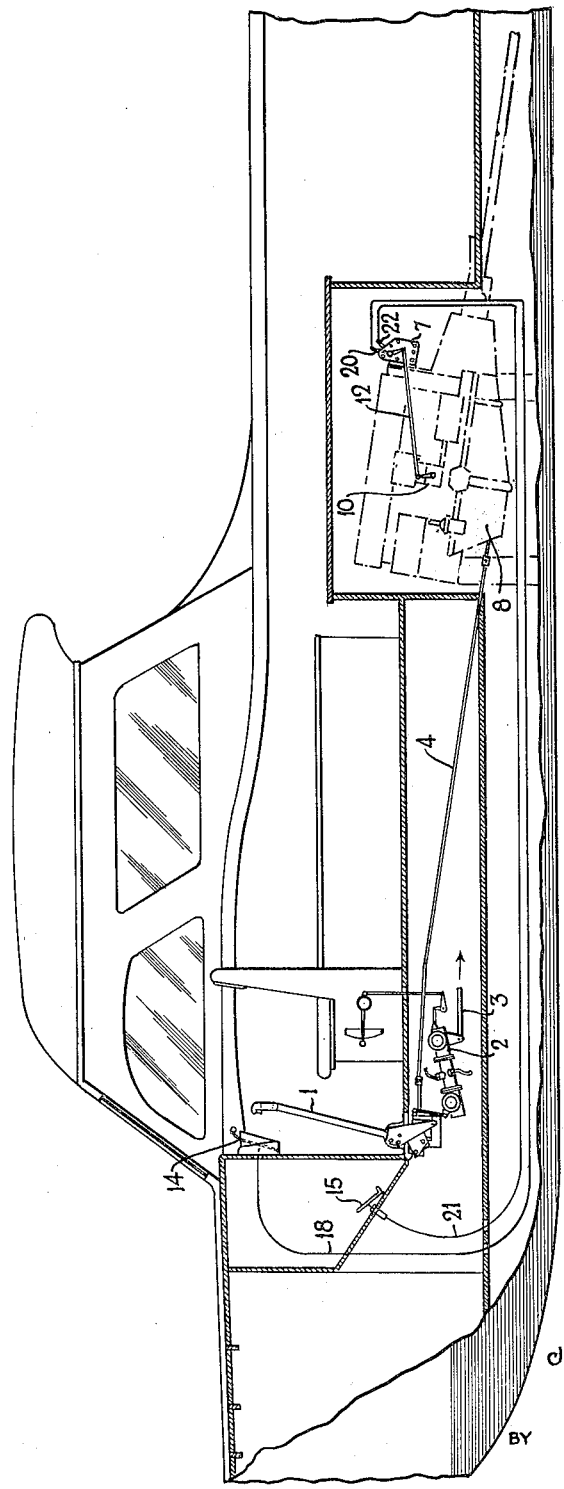
INVENTOR
JOHN F. MORSE
BY
ATTORNEYS Nov. 14, 1950 J. F. MORSE 2,530,205
MARINE ENGINE CONTROL MECHANISM
Filed May 7, 1945 5 Sheets-Sheet 2

INVENTOR
JOHN F. MORSE
BY
ATTORNEYS

Nov. 14, 1950    J. F. MORSE    2,530,205
MARINE ENGINE CONTROL MECHANISM
Filed May 7, 1945    5 Sheets-Sheet 3

INVENTOR
JOHN F. MORSE
BY
ATTORNEYS

Nov. 14, 1950   J. F. MORSE   2,530,205
MARINE ENGINE CONTROL MECHANISM
Filed May 7, 1945   5 Sheets-Sheet 4
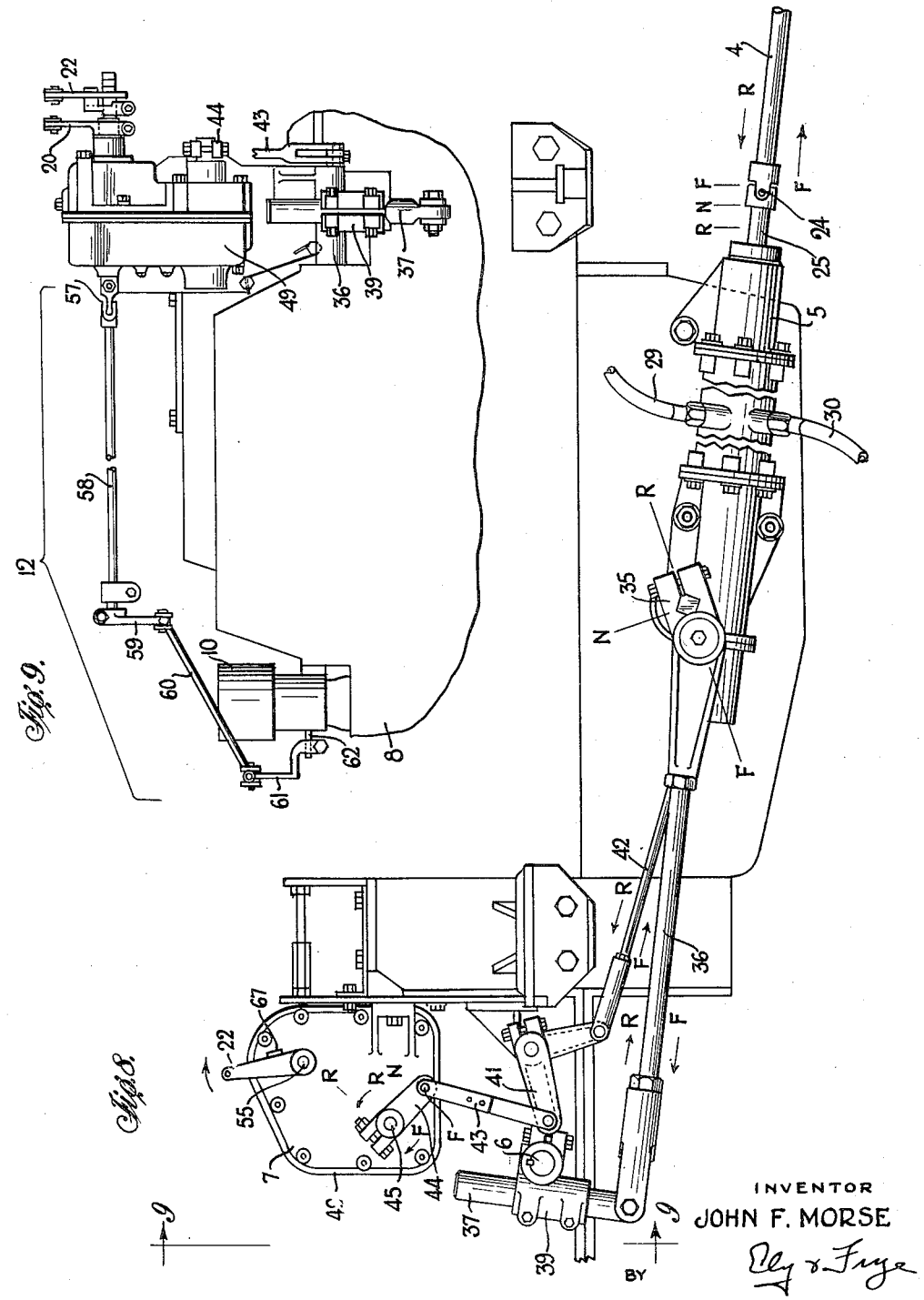
INVENTOR
JOHN F. MORSE
BY
ATTORNEYS Nov. 14, 1950          J. F. MORSE          2,530,205
MARINE ENGINE CONTROL MECHANISM Filed May 7, 1945          5 Sheets-Sheet 5

INVENTOR
JOHN F. MORSE
BY Ely & Frye
ATTORNEYS

Patented Nov. 14, 1950

2,530,205

UNITED STATES PATENT OFFICE 2,530,205

MARINE ENGINE CONTROL MECHANISM

John F. Morse, Hudson, Ohio

Application May 7, 1945, Serial No. 592,495

21 Claims. (Cl. 74—472)

1

The present invention relates to engine controls and particularly to controls for marine engines such as used in power-operated craft. It is the purpose of the invention to provide a mechanical system by which the speed of the engine is properly regulated under all operating conditions. The mechanism, however, provides for allowing full manual control which overrides the automatic controls so that the operation of the engine is always subject to the full control of the operator in the event an emergency requires some quick action on his part.

The invention consists in providing for coordination of the transmission in a power boat with the carburetor so that the speed of the engine is properly controlled when the transmission is in neutral, or going from neutral to forward or into reverse. The device prevents racing of the engine and also provides for a gradual acceleration of the engine after the transmission is shifted to forward or to reverse and for an immediate deceleration of the engine in going into neutral or directly through neutral. This coordination of the engine speed with the position of the transmission prevents excessive wear on the clutch and other elements of the transmission, and stalling of the engine.

The device also employs a dual control, which is usually through a hand throttle and a foot throttle, although two hand throttles may be employed. The operator may, therefore, set the main or hand throttle at a desired engine speed and the engine will automatically pick up to but not exceed that speed and hold it indefinitely. This is particularly desirable in cruising and relieves the operator of much tedium in operating the boat. However, the operator may accelerate the engine by overriding the main or control hand throttle at any time by the operation of the second or auxiliary throttle.

The invention also contemplates the incorporation of a power-operated booster, usually in the form of a fluid-operated power unit, by which the actual shifting of the transmission and the actuation of the carburetor control are performed, which increases the life of the transmission and gives an easier and smoother operation. The employment is not essential to all aspects of the invention.

The invention is preferably applied to and coordinated with a single lever control by which the operator may both steer the craft and operate the transmission. Such a device is covered basically in my prior Patent No. 2,321,098, dated June 8, 1943. The particular design of control

2 lever or stick which it is preferred to use has been described and claimed in my copending application Serial No. 587,887, filed April 12, 1945, now Patent No. 2,495,536 dated January 24, 1950 to which reference may be made. It is sufficient for the purposes of the present application to state that the control lever is pivoted for fore-and-aft movement which is transmitted directly to the transmission or to a power unit or booster which is, in turn, connected to the transmission shaft. For steering, the stick also has a transverse rocking action which is transmitted to the rudder.

The proper operation of a marine engine is one which requires considerable experience, but the system of controls shown herein supplies automatically the proper coordination of engine speed with the shifting of the transmission for it does exactly what is required without attention on the part of the operator. It not only enables a power craft to be correctly operated by one unfamiliar with boat operation, but it relieves the experienced operator of much labor.

There are numerous other advantages and benefits obtained by the control system shown and described herein, it being understood that the invention is illustrated in its best known and preferred form. It will be further understood that the details of the mechanism may be modified or improved without in any manner sacrificing the major features of the invention, and that the invention may be practiced and employed in varied forms which may differ in detail from the embodiment which has been selected for illustration.

In the drawings:

Fig. 1 is a side view of a typical power-operated boat showing the location of the various elements therein. In this view the preferred location of the dual throttles is shown.

Fig. 2 is a side elevation of the control box which is preferably mounted at the engine and which contains the various mechanisms by which the operations of the throttle valve and transmission are coordinated to secure the purposes of the invention. In this view one of the housings is removed from the control box to show the operating parts therein. In this view certain elements have been removed and others are in section to show the mechanism more clearly. The parts are in the position they assume when the transmission is intermediate neutral and full forward.

Fig. 8 is a side elevation of the connections from the transmission shaft to the transmission and to the control box.

Fig. 9 is an end view of the parts shown in Fig. 8, the location of the view being indicated by the line 9—9 of Fig. 8.

Figure 6:
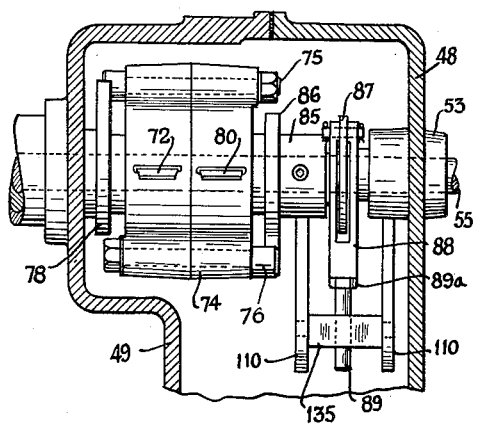
Fig. 6 is a side elevation of the spring drum, the location of the view being indicated by the line 6—6 of Fig. 2.

Referring particularly to Fig. 1 in which the general arrangement of the various major elements of the system is shown, the control stick by which the operator controls both the transmission and the rudder is indicated at 1. As is more particularly described in the aforementioned pending application, this stick is pivoted for fore-and-aft movement and also rocks in a direction at right angles to the pivotal movement. The rocking action is relayed either directly to the rudder or through a power booster unit 2 to a rudder control shaft 3. The pivotal movement is transmitted to a shaft 4 which extends toward the engine and is connected either directly to the transmission shaft 6 or through a power booster unit 5 (Fig. 8) to the transmission shaft. The shaft 6 is connected to any form of transmission and clutch control, the design of which forms no part of the present invention and is, therefore, omitted from the drawings. As stated in the introductory portion hereof, the shaft 4 also operates the carburetor valve through a mechanism which is housed in a control box or unit, indicated as a whole at 7, associated with the engine 8, the outline of which is shown in dotted lines in Fig. 1. The showing of the engine is diagrammatic only as any usual or commercial power unit may be employed. A typical carburetor is indicated at 10, the throttle valve or carburetor valve of which is operated from the control box by a linkage indicated as a whole by the numeral 12 in Fig. 1.

As indicated above, the system illustrated and described herein contemplates a dual control which, in the usual form or preferred embodiment of the invention, comprises what may be termed a main throttle and an auxiliary throttle, the first being preferably a manually controlled throttle provided with a detent so that it may be set at any desired point to give a uniform speed to the engine, this being usually the speed at which the vessel is intended to cruise. Such a main throttle is indicated in Fig. 1 at 14. The auxiliary throttle, which as shown is an ordinary foot throttle, is indicated at 15.

The throttle 14 is set at the desired point for cruising speed and by the operation of the automatic devices to be described the control unit contained in the box 7 will open the carburetor valve to the extent to which the throttle 14 is set, but the setting by the throttle 14 may be overridden by the throttle 15 at any time. This permits the operator to speed the engine up temporarily beyond the limit prescribed by the throttle 14 without disturbing the setting thereof, and when the throttle 15 is released the engine will reassume the designated speed. This arrangement gives the operator complete control of the engine at all times.

The main, hand, or regulatory throttle 14 is connected by flexible shafting 18 to an operating arm 20 at the side of the control box. The auxiliary or foot throttle 15 is connected by flexible shafting 21 to a second arm 22 alongside the arm 20. The arrangement of these levers and the mechanism operated thereby, whereby the unique results set forth are secured, will be described in detail in a later portion hereof, it being sufficient at this time to state that arm 20 has the capability of operating independently or jointly with the arm 22.

Referring now to the connection from the control stick 1 to the transmission shaft 6 and with particular reference to Figs. 8 to 11 incl. The shaft 4 is connected by a swivel joint 24 to the end of a shaft 25 which projects from the power unit 5. This unit, which is usually mounted on the crank casing of the engine, is preferably of the fluid-operated type in which a valve member operated by the shaft 25 admits fluid under pressure to either side of a piston, the motion of which is transmitted to an output shaft 27. The details of such a unit are not shown as they form no part of the present invention. The fluid employed is usually a machine oil which is supplied under pressure to the unit through a line 29 and discharged through a line 30. The pressure is created by an auxiliary pump run by the motor, which also supplies the pressure for the unit 2. Any form of power-operated unit may be employed at 5, but it is preferred to incorporate in the system a unit such as shown in my copending application Serial No. 557,481, filed Oct. 6, 1944, to which reference may be made.

The shaft 27 is formed with a rack 32 which meshes with a gear 33, the shaft of which carries a crank 35 attached to an adjustable link 36. The far end of the link 36 is pivoted to a post 37 which is clamped in a split collar 39 which is keyed to and fastened on the end of the transmission control shaft 6. As shown in Fig. 8, the various elements are in the position which they occupy when the transmission is fully engaged in forward position. The letters "F," "N" and "R" indicate the positions in forward, neutral and reverse, respectively, and the direction in which the elements move in going to that position.

To operate the carburetor or throttle valve control in the box 7 in synchronism with the shifting of the transmission, the end of the shaft 27 is pivoted at 40 to an adjustable link 42 (Fig. 10) which is connected to the control cam shaft 45 through the bell crank 41, link 43 and crank lever 44 which are shown in Fig. 8. The movement of the shaft 45 in going toward forward in views 2, 7 and 8 is clockwise.

Figure 2:
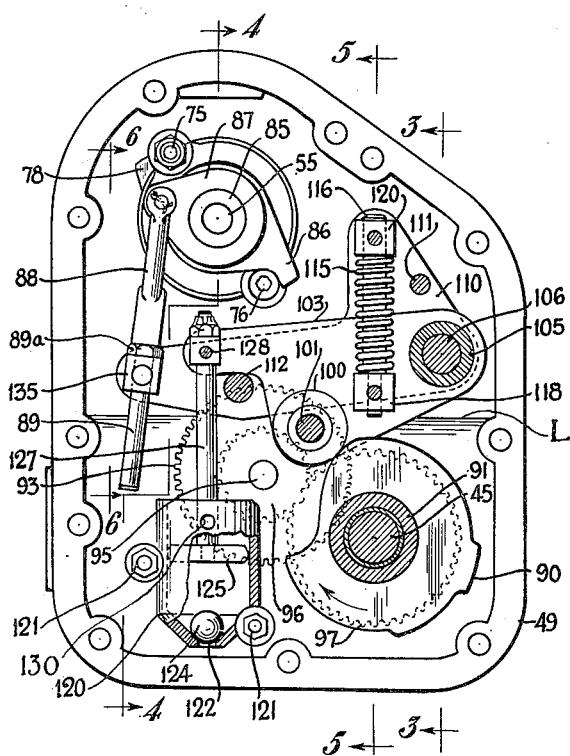

Referring now to the control box 7 and the coordinating mechanism therein:

The box 7 comprises two complementary housings 48 and 49, the former having been removed in Fig. 2. These housings are secured in face to face relation against an oil-tight gasket so that the major working parts may be maintained in a bath of oil, the level of which is indicated at L in Fig. 2. The housing is shown as carried by appropriate brackets and plates on the side of the engine over the transmission shaft 6 and remote from the carburetor 10, although this arrangement is optional. The shaft 45, previously referred to and which has been designated as the cam shaft, is rotatably mounted in oil-tight bearings 51 and 52 in the lower part of the housings 48 and 49. Located in bearings 53 and 54 in the upper part of the housings and projecting from either side thereof is a second shaft 55 which may be termed the carburetor control shaft or throttle valve shaft. On the same side of the box 7 as the lever 44, the shaft 55 carries the two arms 20 and 22 which, as has been described, are connected to and operated by the main or hand throttle and the auxiliary or foot throttle, respectively. On the other end of the shaft 55 is secured one member of the universal joint 57 which is connected by the linkage 12 to the carburetor valve. As shown in Fig. 9, this linkage consists of the shaft 58, crank 59, link 60 and crank 61, the latter being secured to the end of a shaft 62 which operates the usual butterfly valve in the carburetor.

The mechanism which rotates the shaft 55 and thereby regulates the speed of the engine in response to the operation of the two throttles and the transmission to secure the results specified will now be described, it being important to reiterate that the boat operator has complete and immediate control of the engine speed through the auxiliary or foot throttle, but this is so arranged as not to interfere with the automatic control.

The arm 22 is loosely mounted on the end of the valve control shaft 55, being confined between a collar 65 and a pick-up arm 66 which is pinned to the shaft 55. The arm 66 has a lug or projection 67 which extends into the path of the arm 22 at the side thereof where the arm 22 will strike the lug when moving in the direction to open the carburetor valve as shown by the arrow in Fig. 8. This arrangement makes it possible to rotate the shaft 55 by the hand throttle to open or close the valve independently of the arm 22 and the foot throttle. However, the operator may rotate the shaft still further by depressing the foot throttle until the arm 22 engages the arm 66. This makes possible the overriding of the automatic control at all times by the manipulation of the foot throttle.

The arm 20, which is connected to the main or hand throttle, is clamped on the end of a sleeve 70 which projects through the housing 49 and extends partway into the box 7. The extreme inner end of the sleeve 70 is provided with an enlarged hub 71 to which is attached one end of a coil spring 72, the other end of which projects through and is thereby anchored in one section of a spring drum 74. This drum 74 is made of two like, facing sections or housings which are held together by a pair of longitudinal bolts which face oppositely to one another, the heads of the bolts serving as stops. The head of the bolt 75 is directed toward the arm 20 and is located in the path of a dog 78 which is fixed on a collar 79 keyed to the sleeve 70 at the side of the spring drum. Revolution of the sleeve 70 by the operation of the hand throttle will rotate the entire assembly, including the shaft 55, if there is no resistance to the rotation of the latter. If, however, the shaft 55 is prevented from turning as, for example, by the transmission control, the drum 74 will remain stationary, but the sleeve 70 and the dog 78 can rotate to the desired position for hand throttle setting. As the shaft 55 is released by the rotation of the cam shaft 45, the tension created in the spring 72 will rotate the drum and the shaft 55 until the head of the bolt 75 strikes the dog 78. The final position of the shaft 55 depends upon the degree of rotation which has been imparted to the sleeve 70 for the selected cruising speed.

Figure 4:
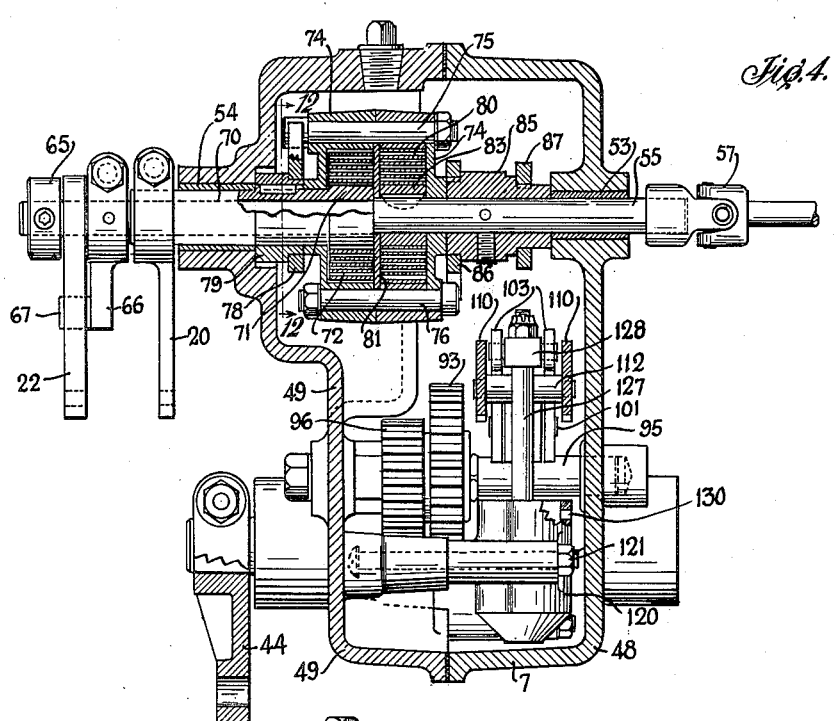
Fig. 4 is a section on the line 4—4 of Fig. 2.

A second coil spring 80 is located in the drum 74, being separated from the spring 72 by the plate 81. The inner end of spring 80 is anchored in a collar 83 which is keyed to the shaft 55 and the outer end of the spring is anchored in the drum. This coil spring, therefore, is wound up by rotation of the shaft 55 in the sleeve 70. Pinned to the shaft 55 to the right of the spring drum, as viewed in Fig. 4, is an elongated hub 85 and to this hub is secured, adjacent the spring drum, a dog 86 which bears against the head of the bolt 76 and acts as a stop for the shaft 55. When the shaft 55 is rotated independently of the spring drum, the dog 86 will move away from the bolt 76 and the spring 80 will be placed under tension. This may be by the action of the foot throttle or by the action of the transmission control. In either case, the shaft is returned to its original cruising or idling position with the lug 86 against the bolt 76 as soon as the force is relaxed. The fact that the shaft 55 will always return to the idling or cruising speed is because the hand throttle and the dog 78 are keyed together and the spring drum cannot rotate beyond the point at which the end of the bolt 75 strikes the dog 78. This, however, does not prevent the shaft 55 from rotation by the foot lever independently of the drum for in such case the arm 22 will pick up the arm 66 and the shaft 55 will rotate in the sleeve 70 and in the drum, winding up the spring 80, and when the foot throttle is released the spring 80 will return the shaft to the position fixed by the contact of the dog 86 with the head of the bolt 76. As the shaft 55 can return under the force of the spring 80 no further than the setting of the lug 78 by the hand lever, the throttle will remain open to the extent determined by the initial setting of the main or hand throttle. This may be idling speed or such cruising speed as has been determined by the operator.

The parts which have been described relate primarily to the mechanism by which the two throttles function and by which a maximum cruising speed (or idling speed) is determined by the setting of the arm 20 and by which this setting may be temporarily overridden by the operation of the arm 22, the shaft 55 and the carburetor valve always returning to their predetermined setting.

The mechanism by which the engine speed is controlled by the condition of the transmission will now be described, it being noted that the shifting of the transmission opens the throttle at the correct speed for proper manipulation of the engine under the conditions prevailing and also determines the maximum speed both in forward and reverse. However, this maximum speed is not attained unless either the main or hand throttle is set for that speed. While the setting of the hand throttle may always be superseded by the manipulation of the auxiliary or foot throttle, the transmission control will never open the valve beyond the hand throttle setting. The overriding of the automatic control by the foot throttle is particularly useful in reverse where a quick stop is desired by reversal of the propeller shaft, or when a sudden maneuvering of the vessel is demanded.

The connection between the valve control shaft 55 and the transmission is through a crank arm 87 which is fixed on the hub 85. On the arm 87 is pivoted a yoke 88 in the cross arm of which is threaded the rod 89 held in position by the nut 89ᵃ. As explained in the following portion of the specification, this rod transmits the action of the transmission control shaft 45 to the shaft 55.

Figure 5:
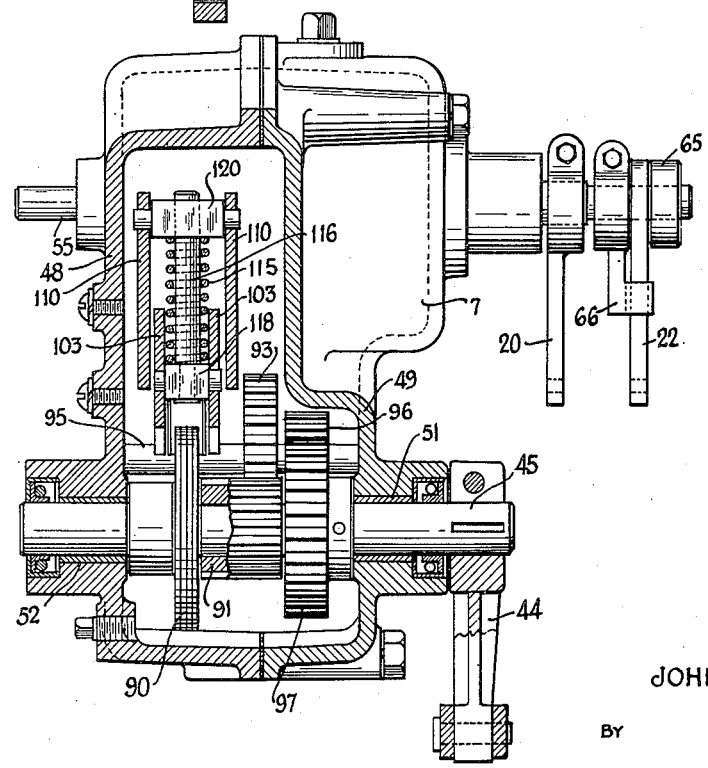
Fig. 5 is a section on the line 5—5 of Fig. 2.
Figure 10:
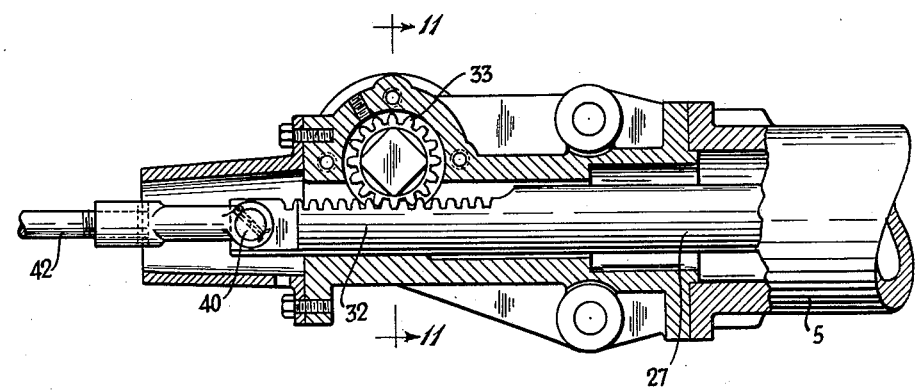
Fig. 10 is a longitudinal section taken at the output end of the booster or fluid-operated unit, this view showing the connections between the transmission and the control box.
Figure 11:
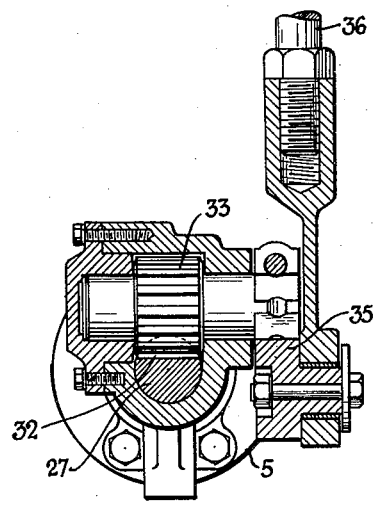
Fig. 11 is a section on the line 11—11 of Fig. 10.
Figure 12:
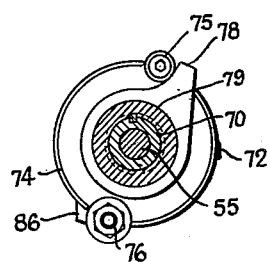
Fig. 12 is a section on the line 12—12 of Fig. 4.

Referring to the cam shaft 45, it will be recalled that this element is rotated simultaneously with the rotation of the shaft 6 which controls the transmission. The control cam is indicated by the numeral 90 and its effective rotation from one extreme to the other is about 300°, while as shown in Fig. 9, the cam shaft 45 rotates slightly over 90°. The cam 90 is, therefore, carried by a sleeve 91 rotatably mounted on the shaft 45. The sleeve is formed with gear teeth which mesh with an idler gear 93 carried by the shaft 95. The gear 93 rotates with a smaller gear 96 which meshes with a gear 97 pinned to the cam shaft 45, and this train of gears gives the increased arc of rotation which is required of the cam. As indicated in Fig. 5, the cam is preferably made of a number of plates which are stamped out to the proper configuration.

Figure 7:
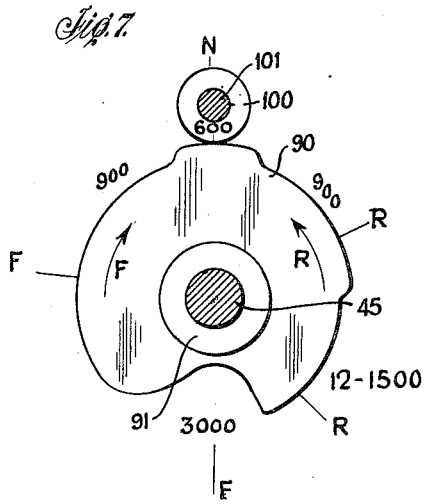
Fig. 7 is a view showing the control cam for governing the carburetor valve and thereby the speed of the engine. The cam roller is shown in the position which it occupies when the transmission is in neutral.

The configuration of the cam 90 is shown in Fig. 2, but more clearly in Fig. 7. On the surface of the cam rides a cam roller 100. In Fig. 7 the cam is shown in the position of idling speed while in Fig. 2 it is in the position where the valve is about to be opened for full-speed ahead. The figures at the side of the cam give engine speeds during the various positions of the cam, but these are merely suggested as any engine speeds may be employed at the various positions of the transmission. Referring to the numerals in Fig. 7, 600 R. P. M. at the high spot in the cam is the selected idling speed when the transmission is in neutral. On the forward side of the cam an area of 900 R. P. M. is designated. This will give a proper engine speed so that the clutch may be engaged without excessive wear and the engine will not stall. After the clutch is fully engaged, the roller 100 will be over the deep recess of the cam and the engine may then attain a speed of 3,000 R. P. M. as the roller is permitted to drop into this recess. On the reverse side of the cam the initial speed is first controlled at 900 R. P. M. and after the clutch is fully engaged, the speed may reach 1200 to 1500 R. P. M. Of course, any of the speeds may be changed by changing the configuration of the cam.

Figure 3:
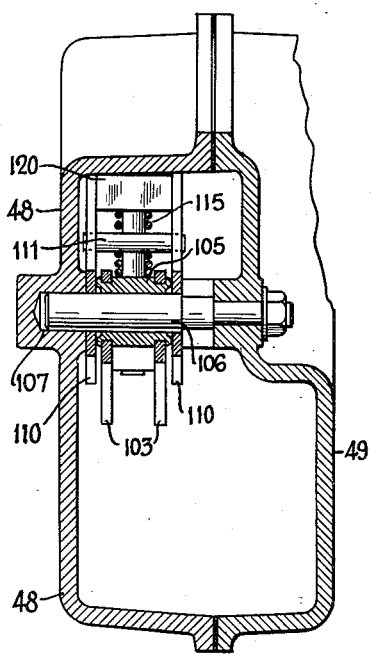
Fig. 3 is a section on the line 3—3 of Fig. 2.

The roller 100 is freely rotatable upon a pin 101 carried in the lower portion of two parallel, substantially triangular-shaped arms 103. These arms are fixed at their rear ends to a sleeve 105 which rocks about a shaft 106 fixed in the housing 49 at the right of the control box as viewed in Fig. 3 and extending into a socket 107 in the housing 48. Rotatably mounted on the shaft 106 at the sides of the sleeve 105 and spanning the arms 103 are two parallel arms 110. These arms 110 are held in proper spaced relation by a rivet pin 111 at the rear and a second rivet pin 112 at the front, the latter pin having an added function as will be stated. The pairs of arms 103 and 110 have both a joint and an independent movement and are yieldingly spread apart by means of a relatively heavy compression spring 115 which surrounds a pin 116 the lower end of which is reduced and riveted in a cross piece 118 pivoted in the arms 103. The upper end of the pin 116 slides in a cross piece 120 pivotally mounted in upwardly extending portions of the arms 110. The force of the spring 115 tends to keep the roller 100 against the surface of the cam, but the downward movement of the arms 103 is limited when the forward extensions of the arms 103 contact the rivet 112.

It will also be noted that when the roller 100 is resting upon the cam 90, downward movement of the arm 103 is retarded by the dashpot, to be described, while the force of the spring 115 will cause the free ends of arms 110 to be elevated until arrested by contact of the rivet 112 with the lower side of the arms 103, or by contact with the nut 89ᵃ on the rod 89 in the manner to be described. It should also be stated that the force of the spring 115 is greater than either spring 72 or 80 so that the automatic control may function properly.

As stated in the introductory portion of the specification, it is one of the objects of the invention to insure a gradual opening of the throttle after the clutch is fully engaged so that the top engine speed is obtained at a rate which does not stall or choke the engine. The acceleration may be more or less rapid as is desired, but a too sudden acceleration of the engine is a desirable thing to avoid. For this dampening action, the dashpot 120 referred to above is provided. This is a cylinder preferably carried by the housing 49 through bolts 121. It is located below the oil level and at its lowermost point is provided with a port 122 over which is seated the floating ball check valve 124 (Fig. 2). Fitting within the cylinder is a piston 125 having a sufficiently loose fit to enable the dashpot to function properly. Piston 125 is carried on the lower end of a vertical shaft 127. The upper end of the shaft 127 is secured in a block 128 pivotally mounted in the extremities of the arms 103.

It will be seen, therefore, that descent of the arms 103 is retarded by the dashpot and, therefore, when the cam 90 rotates to a point where the roller 100 is opposite a low portion of the cam, as, for instance, the area marked "3000," the descent of the roller and, consequently, the opening of the throttle will be as gradual as the dashpot will allow. It is desirable, however, in the short period just as the transmission is leaving neutral in either direction that the speed of the engine be immediately stepped up sufficiently so as to avoid stalling of the engine as the clutch engages. To permit the unrestricted movement of the roller 100 and lowering of the arms 103 at this point, a hole 130 is made in the wall of the dashpot at the proper location to permit the escape of oil from the dashpot and provide for this momentary acceleration of engine speed. As the piston 125 is raised, the dashpot is immediately replenished through the check valve port 122.

The rotation of the shaft 55 by the rotation of the cam 90, in proper timed relation to the shifting of the clutch, is obtained through the arms 110 which, as has been explained, normally operate in unison with the arms 103.

Between the outer or free extremities of the arms 110 is located the pivoted cross piece 135 through which the rod 89 freely slides except as limited by the contact of the nut 89ᵃ with the upper surface of the cross-piece. The function of the link 88—89 and the cross piece 135 is to control the speed at which the carburetor valve opens by the rate at which the arm 103 descends. If the arms 110 are elevated, rotation of the shaft 55 is prevented by the contact of the nut 89ᵃ with the upper surface of the cross piece 135. If the hand throttle is advanced, rotation of the sleeve 70 will wind up the spring 72 because the shaft 55 cannot rotate. This is because the spring 115 is more powerful than the spring 72 and, therefore, the pin 112 is held against the arms 113 and the roller 100 is riding against the cam surface. As the cam 90 is rotated by the operation of the transmission, the roller 100 will follow the cam and the shaft 55 will rotate until the head of the bolt 75 strikes the dog 78. This serves to limit the automatic opening of the carburetor valve to the extent permitted by the setting of the hand throttle. The roller 100 will continue to follow the cam and the arms 103 and 110 will continue their downward movement and the block 135 will leave the nut 89ª, but no further motion will be transmitted to the shaft 55. Such a condition is shown in Fig. 6. When the mechanism is in the condition shown in this view, the engine speed has reached the limit set by the hand throttle short of its possible maximum speed.

*Résumé of operation*

The operator starts the engine, with the transmission in neutral and the hand throttle at idling speed, utilizing the foot throttle until the engine is running properly at idling speed. The foot throttle turns the shaft 55 during this operation and opens the carburetor valve because the arm 22 strikes the pick-up arm 66, and the shaft 55, which is directly connected to the linkage 12, will rotate in the drum 74, winding up the spring 82. The rotation of the shaft 55 will also rotate the hub 85, but the link 88—89 will not prevent this rotation because the downward movement of the link rocks the arms 110 independently of the arms 103, compressing the spring 115. Release of the foot treadle restores the mechanism in the control box to its original condition.

Assuming the vessel is to go forward, the operator first sets the main or hand throttle to the desired speed, but the engine continues to idle and no rotation is imparted to the shaft 55 because the hub 85 is restrained by contact of the nut 89ª with the cross-piece 135. The only action imparted is to shift the dog 78 to the position at which cruising speed is determined, and to wind the spring 72. The operator then moves the control stick 1 forwardly which, through the power unit 5, or by direct connection, shifts the link 36 to the left and actuates the transmission shaft 6. This motion also shifts the link 42 to the right, rotating the cam 90 so that the roller 100 first rides on the portion of the cam marked "900" and then over the deep part of the cam which corresponds to the maximum engine speed. The downward motion of the arms 103 imparted by the cam 90 is transmitted to the arms 110 ad the cross piece 135 is lowered, permitting the crank arm 87 to rotate in counterclockwise direction as viewed in Fig. 2. This is because the energy, stored in the spring 72 by the actuation of the hand throttle, is released to turn the drum 74 and this motion is transmitted to the hub 85 through the bolt 76 and lug 86. As the spring 115 is stronger than the spring 72, there will be no relative movement of the arms 103 and 110 at this time. It will be noted that the area of the cam immediately beyond the neutral point is of sufficient extent to hold the engine speed momentarily at say 900 R. P. M. and this is for the purpose of preventing overrunning of the motor at the moment the clutch engages and yet speeds up the motor sufficiently to prevent stalling. It will also be observed that during the first operation, the movement of the arms 103 is not retarded by the dashpot as during that period the piston 120 has not passed over the hole 130.

As the roller 100 rides into the low spot of the cam, the piston 125 passes beyond the hole and the continued downward movement of the arm 103 and the opening of the carburetor valve are retarded sufficiently so that the engine attains its maximum speed at the optimum rate.

The rotation of the shaft 55 is, however, arrested at the chosen setting of the hand throttle when the head of the bolt 75 strikes the extension on the dog 78.

When the transmission shaft is operated to place the transmission in neutral, the roller 100 is picked up by the cam and the arm is elevated until the roller rides on the neutral point on the cam. The raising of the combined levers 103 and 110 lifts the link 88 and 89 and restores the shaft 55 to bring the carburetor back to idling speed. This prevents racing of the engine in neutral.

On the reverse side of the cam there is a like area marked "900" which insures that the engine does not race or stall as the reverse clutch is engaged. As high speed in reverse is rarely desirable except for a sudden stop, the continuation of the cam, which corresponds to full engagement of the clutch, is preferably such as to insure a somewhat less than maximum speed of the engine, although this particular refinement is optional and the cam may be cut so as to give full speed in reverse.

It must be noted, however, that at any stage of operation and in any position of the automatic mechanism, the operator may speed up the motor by depressing the foot throttle, for any movement of the arm 22 beyond the arm 20 will rotate the shaft 55 from that point. During this additional rotation, energy to return the shaft 55 to its neutral position, or to the point determined by the setting of the hand throttle, is stored up in the spring 80. The hub 85 and the arm 87 rotate with the shaft and the arms 110 are free to move downwardly with respect to the arms 103, because the force applied to the foot throttle will compress the spring 115.

It should further be noted that some residual tension is always present in the springs 72 and 80 so that the shaft 55 and all of the parts carried thereby will rotate as a single unit until and unless the shaft 55 is prevented from rotation.

The mechanism which has been described and shown here provides a complete and automatic control of the engine which operates in coordination with the transmission to control the engine speed so that the entire power unit operates at its highest efficiency. If the operator is required to go directly from forward into reverse, or reverse into forward, the movement of the transmission will slow down the engine as the neutral point is reached to the proper speed to permit immediate reengagement of the transmission, the engine is then first speeded up to the point where it will not stall and finally speeded up to a rate of acceleration determined by the operation of the dashpot and to a point determined by the setting of the hand throttle. But this does not prevent the operator from overriding the entire automatic controls at any time.

The mechanism, therefore, carries out exactly the operations which a skilled power-boat operator will perform in handling the boat.

While the invention is particularly designed for and has especial utility in connection with the operation of marine engines, it may also be employed advantageously with all types of engines for a great variety of applications, and the claims are therefore not to be considered as limited to water-borne craft.

The specification and drawings show a complete system for securing the desirable results set forth, including a power unit to perform the actual shifting of the transmission. Any one of the various refinements may be omitted without sacrificing the beneficial results of other features, and the details and specific arrangements of the various elements may be modified or improved without departing from the broader aspects of the invention as set forth in the claims.

What is claimed is:

1. In combination with an engine having a throttle valve and a transmission operating means, a main throttle which may be set at any desired engine speed, an auxiliary throttle, means by which the auxiliary throttle may open the valve beyond the point at which the main throttle is set, a valve control shaft, and means operating in synchronism with the transmission operating means for opening the valve first to a limited extent as the transmission passes beyond neutral and then to the full extent determined by the setting of the main throttle.

2. In combination with an engine having a throttle valve and a transmission operating means, a main throttle which may be set at any desired engine speed, an auxiliary throttle, means by which the auxiliary throttle may open the valve beyond the point at which the main throttle is set, a valve control shaft, a rotary cam operating in synchronism with the transmission operating means for opening the valve to the extent determined by the setting of the main throttle, and a checking device operable after the cam has completed its rotation for retarding the opening of the valve.

3. In a device for controlling the speed of an engine, a transmission shifter, a cam rotatable with the shifter, a valve control shaft, a cam follower, means to retard the movement of the cam follower after the cam has been rotated to its full extent by the transmission shifter, connections from the cam follower to rotate the shaft, a main throttle by which the extent of rotation of the shaft by the cam may be limited, an auxiliary throttle, direct connections from the auxiliary throttle to the shaft whereby the shaft may be rotated beyond the limit set by the main throttle, a throttle valve, and driving connections between the shaft and the throttle valve.

4. An engine having a transmission shifter associated therewith and means for controlling the speed of the engine in accordance with the operation of the shifter, said means comprising a throttle valve control shaft, a cam movable by the shifter, a cam follower, means set in motion by the cam follower to actuate the control shaft, and a checking device to retard the movement of the shaft effective only after the cam has been moved to extreme position.

5. The combination of an engine and a transmission shifter, with means for controlling the speed of the engine in synchronism with the operation of the shifter, said means comprising a rotatable throttle valve control shaft, a throttle, spring means placed under tension by the opening movement of the throttle and operable to rotate the shaft, a shiftable stop movable by the throttle, a cam movable with the movement of the shifter, and means actuated by the movement of the cam which permits the shaft to rotate after the transmission shifter has been moved from neutral position first to a limited extent and then to the full extent determined by the location of the stop.

6. The combination of an engine and a transmission shifter, with means for controlling the speed of the engine in synchronism with the operation of the shifter, said means comprising a rotatable throttle valve control shaft, a main throttle, spring means placed under tension by the opening movement of the main throttle, a shiftable stop movable by the main throttle, and means actuated by the movement of the shifter to release the shaft for movement first to a limited extent and then to the full extent determined by the position of the stop, an auxiliary throttle, and means whereby the shaft may be rotated by the auxiliary throttle beyond the limit set by the stop.

7. The combination of an engine and a transmission shifter, with means for controlling the speed of the engine in synchronism with the operation of the shifter, said means comprising a rotatable throttle valve control shaft, a main throttle, spring means placed under tension by the opening movement of the main throttle, a shiftable stop movable by the main throttle, a cam rotatable with the movement of the shifter, a cam follower, means actuated by the movement of the follower to release the shaft for movement to the extent determined by the position of the stop, an auxiliary throttle, and means whereby the shaft may be rotated by the auxiliary throttle beyond the limit set by the stop, without disturbing the main throttle or the cam.

8. The combination of an engine and a transmission shifter, with means for controlling the speed of the engine in synchronism with the operation of the shifter, said means comprising a rotatable throttle valve control shaft, a throttle, spring means placed under tension by the opening movement of the throttle and operable to rotate the shaft, means to permit the shaft to rotate under the influence of the spring, said last named means being actuated by the movement of the shifter, and a checking device to retard the rotation of the shaft after the shifter and said last-named means have been moved to their extreme positions.

9. The combination of an engine and a transmission shifter, with means for controlling the speed of the engine in synchronism with the operation of the shifter, said means comprising a rotatable throttle valve control shaft, a throttle, spring means placed under tension by the opening movement of the throttle and operable to rotate the shaft, a cam rotatable with the movement of the shifter, a cam follower, connections from the cam follower by which the shaft is permitted to rotate under the influence of the spring after the transmission shifter has been moved from neutral position, and a checking device to retard the rotation of the shaft after the shifter and cam have been moved to their extreme positions.

10. An engine control mechanism comprising a transmission shifter movable to either side of neutral, a rotatable throttle valve control shaft, a rotatable cam connected with and movable in synchronism with the shifter, a cam follower, and means responsive to motion of the cam follower to rotate the shaft and bring the engine to idling speed as the transmission shaft moves into neutral position, and to control the acceleration of the engine in a graduated manner as the shifter moves toward either extreme, said means including a resilient connection whereby the shaft is operable independently of the cam and follower.

11. An engine control mechanism comprising a transmission shifter movable to either side of neutral, a rotatable throttle valve control shaft, a rotatable cam connected with and movable in synchronism with the shifter, a cam follower, means responsive to motion of the cam follower to rotate the shaft and bring the engine to idling speed as the transmission shaft moves into neutral position, and to control the acceleration of the engine in a graduated manner as the shifter moves toward either extreme, a manually adjustable throttle which may be set to limit the rotation of the shaft, said means including a resilient connection whereby the shaft is operable independently of the cam, follower and adjustable throttle.

12. An engine control mechanism comprising a transmission shifter movable to either side of neutral, a rotatable throttle valve control shaft, a rotatable cam connected with and movable in synchronism with the shifter, a cam follower, means responsive to motion of the cam follower to rotate the shaft and bring the engine to idling speed as the transmission shaft moves into neutral position, and to control the acceleration of the engine in a graduated manner as the shifter moves toward either extreme, a main throttle which is adjustable to limit the rotation of the shaft, and an auxiliary throttle, said means including a resilient connection whereby the shaft may be rotated by the auxiliary throttle beyond the limit set by the main throttle independently of the position of the cam.

13. An engine control mechanism comprising a transmission shifter movable to either side of neutral, a rotatable throttle valve control shaft, a rotatable cam connected with and movable in synchronism with the shifter, a cam follower, means actuated by the cam follower to rotate the shaft and bring the engine to idling speed as the transmission shaft moves into neutral position, and to control the acceleration of the engine as the shifter moves toward either extreme, and a checking device to retard the movement of the cam follower effective only after the cam has been moved to extreme position.

14. An apparatus for controlling the speed of an engine in synchronism with the operation of the transmission comprising a transmission shifter, a cam movable by the shifter, a throttle valve control shaft, a cam follower, and means connecting the cam follower and the control shaft, said cam being designed and arranged so that the shaft is moved to bring the engine to idling speed when the shifter is in neutral position, to impart a limited acceleration to the engine immediately after the transmission moves to either side of neutral, and to permit full speed ahead when the shifter is at the limit of its forward movement.

15. An apparatus for controlling the speed of an engine in synchronism with the operation of the transmission comprising a transmission shifter, a cam movable by the shifter, a throttle valve control shaft, a cam follower, means connecting the cam follower and the control shaft, said cam being designed and arranged so that the shaft is moved to bring the engine to idling speed when the shifter is in neutral position, to impart a limited acceleration to the engine immediately after the transmission moves to either side of neutral, and to permit full speed ahead when the shifter is at the limit of its forward movement, a main throttle by which the engine speed may be limited, and an auxiliary throttle having direct connections to the shaft independent of the control means and operable to move the shaft to its full extent without disturbing the main throttle or the cam.

16. An apparatus for controlling the speed of an engine in synchronism with the operation of the transmission comprising a transmission shifter, a cam movable by the shifter, a throttle valve control shaft, a cam follower, means connecting the cam follower and the control shaft, said cam being designed and arranged so that the shaft is moved to bring the engine to idling speed when the shifter is in neutral position, to impart a limited acceleration to the engine immediately after the transmission moves to either side of neutral, and to permit full speed ahead when the shifter is at the limit of its forward movement, a main throttle by which the engine speed ahead may be limited without stopping the movement of the cam, and an auxiliary throttle having direct connections to the shaft, the connections between the shaft and the cam follower being so arranged and designed as to permit the shaft to be rotated by the auxiliary throttle beyond the limit set by the main throttle.

17. An apparatus for controlling the speed of an engine in synchronism with the operation of the transmission comprising a transmission shifter, a cam rotatable by the movement of the shifter, a throttle valve control shaft, a cam follower, means connecting the cam follower and the control shaft, said cam being designed and arranged so that the shaft is moved to bring the engine to idling speed when the shifter is in neutral position, to impart a limited acceleration to the engine immediately after the transmission moves to either side of neutral, and to permit full speed ahead when the shifter is at the limit of its forward movement, a main throttle by which the engine speed ahead may be limited without stopping the rotation of the cam, and an auxiliary throttle having direct connections to the shaft, the connections between the shaft and the cam follower being so arranged and designed as to permit the shaft to be rotated by the auxiliary throttle beyond the limits set by either the main throttle or the cam.

18. An apparatus for controlling the speed of an engine in synchronism with the operation of the transmission comprising a transmission shifter, a cam movable by the shifter, a throttle valve control shaft, a cam follower, means connecting the cam follower and the control shaft, said cam being designed and arranged so that the shaft is moved to bring the engine to idling speed when the shifter is in neutral position, to impart a limited acceleration to the engine immediately after the transmission moves to either side of neutral, and to permit full speed ahead when the shifter is at the limit of its forward movement, and means to retard the rotation of the shaft effective only after the shifter is at the limit of its forward movement.

19. For use with an engine having a throttle valve and a transmission shifter, in combination, a main throttle, an auxiliary throttle, a valve-control shaft adapted to be connected to the valve, means whereby the valve-control shaft may be actuated directly by the auxiliary throttle, operating connections between the valve-control shaft and the main throttle, means controllable by the operation of the transmission shifter interposed in said operating connections, limiting in varying degree the extent to which the said shaft may be rotated throughout the operation of the shifter, and further means interposed in said operating connections to govern the rate of rotation of the said shaft during final stages of engagement of the shifter.

20. For use with an engine having a throttle valve and a transmission shifter, in combination, a main throttle, an auxiliary throttle, a valve-control shaft adapted to be connected to the valve, means whereby the valve-control shaft may be actuated directly by the auxiliary throttle, operating connections between the valve-control shaft and the main throttle, means controllable by the operation of the transmission shifter interposed in said operating connections, limiting in varying degree the extent to which the said shaft may be rotated throughout the operation of the shifter, and further means interposed in said operating connections to govern the rate of rotation of the said shaft during final stages of engagement of the shifter, said first-mentioned means being operable independently of the second-mentioned means or the third-mentioned means.

21. For use with an engine having a throttle valve and a transmission shifter, in combination, a main throttle, an auxiliary throttle, a valve-control shaft adapted to be connected to the valve, means whereby the valve-control shaft may be actuated directly by the auxiliary throttle, operating connections between the valve-control shaft and the main throttle, means interposed in said operating connections and limiting in varying degree the extent to which the said shaft may be rotated throughout the rotation of the cam, and further means interposed in said operating connections to govern the rate of rotation of the said shaft during final stages of rotation of the cam independently of the cam, said first-named means being operable independently of the said cam or operating connections.

JOHN F. MORSE.

REFERENCES CITED

The following references are of record in the file of this patent:

UNITED STATES PATENTS

| Number | Name | Date |
|---|---|---|
| 1,247,299 | Loomis | Nov. 20, 1917 |
| 1,347,017 | Davies | July 20, 1920 |
| 2,071,785 | Ehrlich | Feb. 23, 1937 |
| 2,206,771 | Dugas | July 2, 1940 |
| 2,234,019 | Bragg | Mar. 4, 1941 |
| 2,321,098 | Morse | June 8, 1943 |
| 2,387,370 | Wallace et al. | Oct. 23, 1945 |
| 2,426,064 | Stevens | Aug. 19, 1947 |

FOREIGN PATENTS

| Number | Country | Date |
|---|---|---|
| 285,287 | Great Britain | Feb. 16, 1928 |